United States Patent Office 3,703,545
Patented Nov. 21, 1972

3,703,545
POLYALKYLENEPOLYAMINES WITH N-(2-HYDROXY-3-SULFOPROPYL) GROUPS
Avis L. McCrary, Lake Jackson, Tex., assignor to The Dow Chemical Company, Midland, Mich.
No Drawing. Filed July 2, 1970, Ser. No. 52,101
Int. Cl. C07c *143/14;* C07f *15/02;* A01n *7/00*
U.S. Cl. 260—513 N                     5 Claims

ABSTRACT OF THE DISCLOSURE

Polyalkylenepolyamines wherein the amino hydrogen atoms have been replaced by carboxymethyl and 2-hydroxy-3-sulfopropyl groups are effective iron chelating agents useful for promoting plant growth. Those compounds where most of the substituents are 2-hydroxy-3-sulfopropyl groups have superior iron chelating capacity, particularly at high pH levels.

BACKGROUND OF THE INVENTION

This invention pertains to new chemical compounds and to their use in promoting the growth of plants by supplying necessary metal nutrients in an available form.

Plants are known to require a number of metallic elements in the soil for proper growth and development. Metals such as potassium, magnesium, and iron are particularly important although the actual quantities needed by plants may be small or even trace amounts in at least slightly soluble form to be available to plants. In the case of iron, the problem of iron deficiency often arises in alkaline soils where there may be plenty of iron present, but it is all in the form of insoluble oxide or hydroxide. Plants growing in such soils thus can suffer from a lack of what surrounds them in useless abundance, a case of "water, water, everywhere nor any drop to drink."

An effective means for correcting an iron deficiency problem has been the addition to the soil of a chelating agent, a compound which is capable of binding and solubilizing iron which would otherwise be unavailable for plant nutrition. When iron is already present in the soil, only the chelating compound itself need be added, but if the soil is deficient in iron, the metal can be added in combination with the chelating agent, preferably as the preformed iron chelate. In the past, phenolic compounds such as derivatives of salicylaldehyde and substituted amines such as carboxylated ethylenediamine have been used for the purpose. Hemwall, U.S. 3,091,522, describes the use of alkylenediamines and polyalkylene-polyamines having carboxymethyl groups plus a limited number of 2-hydroxy-3-sulfopropyl groups as substituents on the nitrogen atoms. Such compounds are effective chelating agents for iron under most conditions, but their chelating capacity drops off at higher pH levels.

SUMMARY OF THE INVENTION

Iron chelating agents have now been found which offer superior capacity for chelating iron over a broad range of pH and which have particular advantage over related known compounds at high pH values. These new compounds have the following formula:

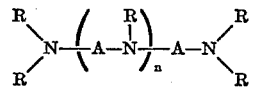

wherein $n$ is an integer from 1 to about 20, A is an alkylene radical of 2–3 carbon atoms, and each R is a carboxymethyl group or a 2-hydroxy-3-sulfopropyl group, the total number of 2-hydroxy-3-sulfopropyl groups in each molecule being greater than the number of carboxymethyl groups. These compounds or their water-soluble salts can be added to soils deficient in available iron as such, for example, as a water solution, but they are preferably added as their iron chelate dispersed in or supported on an inorganic carrier or a fertilizer composition. When iron is already present in the soil although in a form not readily available to plants, only the compounds themselves or preferably their water-soluble salts such as the alkali metal or ammonium salts need be added, since the iron chelate will then form in the soil.

DETAILED DESCRIPTION

In the family of compounds defined by the above general formula, A can be propylene, trimethylene, or ethylene and it is preferably the latter. Although $n$ can have a value as high as 20, preferred compounds are those wherein $n$ has a value of 1–5. Therefore, the most preferred compounds of the present invention are the substituted derivatives as defined of diethylenetriamine, triethylenetetramine, tetraethylenepentamine, pentaethylenehexamine, and hexaethyleneheptamine. However, also included in the invention are the corresponding derivatives of other polyalkylenepolyamines falling under the broad definition, for example, the derivatives of dipropylenetriamine, tetrapropylenepentamine, 3,3'-iminobis(propylamine), nonaethylenedecamine, and polyethylenepolyamines and polypropylenepolyamines generally of higher molecular weight to the maximum of 1000 molecular weight as defined.

The R substituents are defined as carboxymethyl groups which have the Formula —$CH_2CO_2H$ or as 2-hydroxy-3-sulfopropyl groups which have the Formula

—$CH_2CHOHCH_2SO_3H$

It is to be understood herein that in speaking of these acidic substituents, both in the present specification and in the appended claims, not only are their acid forms intended as illustrated above, but also intended and included by the above terms are their obvious equivalents, the water-soluble salts such as the ammonium and alkali metal salts, particularly the sodium and potassium salts.

As previously set forth, the 2-hydroxy-3-sulfopropyl substituents, referred to as sulfonate groups for convenience, must always be in excess over the carboxymethyl substituents on a particular molecule. In other words, the carboxymethyl groups can range from zero to one less than the number of sulfonate groups. In a dialkylenetriamine compound, for example, the sulfonate groups can be from 3 to 5 in number while the carboxymethyl groups correspondingly range from two to zero.

The compounds of the invention can be prepared by any of several broadly conventional procedures. The sulfonate groups can be substituted on the polyamine molecule by reacting the polyamine in aqueous medium with 3-chloro-2-hydroxypropanesulfonic acid or a salt thereof or with an equivalent reagent such as 2,3-epoxypropanesulfonate or the 3-sultone of 2,3-dihydroxypropanesulfonic acid. Preferably, sodium 3-chloro-2-hydroxypropanesulfonate is reacted with the polyamine in the desired proportion at about 70–105° C. in the presence of excess sodium hydroxide. If desired, the caustic can be added after or during reaction of the polyamine with the sulfonate. The reaction is desirably carried out in water solution, but less than the quantity of water necessary to dissolve all of the reactants can be used.

Similarly, carboxymethylation of the polyamine can be accomplished by any of several conventional and equivalent procedures. Aqueous sodium cyanide and formaldehyde are reacted in equivalent or slight excess over the stoichiometric quantities with the polyamine compound at about 80–105° C. in a preferred procedure. Carboxymethylation can also be done using a combination of glycolonitrile and an alkali hydroxide. The carboxymethylation reaction in either case includes a final hydrolylis step, for example, reflux of the aqueous mixture for several hours.

Ordinarily, the sulfonate group substitution reaction is carried out first, then the remaining amine hydrogen atoms are replaced by carboxymethyl groups. The reactions can also be craried out in reverse order.

When both the sulfonate group substitution and the carboxymethylation reactions are run, the reaction product is a mixture, probably of all possible isomeric distributions of the two substituents on the polyamine molecule. For example, when diethylenetriamine is substituted with three sulfonate groups and two carboxymethyl groups as shown in Example 2 below, compounds present in the reaction mixture include the sodium salts of N,N,N'''-tris (2-hydroxy - 3 - sulfopropyl)-N',N''-bis(carboxymethyl) diethylenetriamine, N,N',N'''-tris(2 - hydroxy-3-sulfopropyl) - N,N'' - bis(carboxymethyl)diethylenetriamine, and N,N,N'-tris(2 - hydroxy-3-sulfopropyl) - N'',N'''-bis(carboxymethyl)diethylenetriamine. However, since the chelating properties of these isomeric compounds are substantially the same, the isolation of a particular isomer is of no importance in the use of the compounds as chelating agents.

EXAMPLE 1

A solution of 11.7 g. of triethylentetramine, 12.8 g. of NaOH, and 62.8 g. of sodium 3-chloro-2-hydroxypropanesulfonate in 122 ml. of water was stirred at 80–90° C. for 2 hours. The temperature of the solution was then raised to 95° C. and 43 g. of 20% aqueous NaCN and 35 g. of 16% aqueous formaldehyde were simultaneously added over a period of two hours. The reaction mixture was then heated at reflux temperature for an additional ten hours, cooled, and diluted to one liter for determination of iron chelation capacity. The product was essentially a water solution of the sodium chloride of reaction plus mixed isomers of substituted triethylenetetramine wherein the six amino hydrogen atoms had been replaced by four sodium 2-hydroxy-3-sulfopropyl groups and two sodium carboxymethyl groups.

EXAMPLES 2–5

Following the procedure of Example 1, various polyethylenepolyamines were reacted in aqueous solution with sodium 3-chloro-2-hydroxypropanesulfonate in the presence of sodium hydroxide and then further reacted with sodium cyanide and formaldehyde sufficient to substitute carboxymethyl groups for the remaining amine hydrogen atoms. In one case, the polyamine was reacted with enough sulfonate to replace all of the amine hydrogen atoms with sulfonate groups. Also prepared by the same procedure were analogous substituted polyamines having a lower ratio of 2-hydroxy-3-sulfopropyl substituents.

TABLE I

| Example | Polyamine | Substituents per molecule | |
|---|---|---|---|
| | | HPS [1] | CM [2] |
| 2 | Diethylenetriamine | 3 | 2 |
| 3 | Triethylenetetramine | 6 | 0 |
| 4 | Tetraethylenepentamine | 4 | 3 |
| 5 | do | 5 | 2 |
| A | Diethylenetriamine | 1 | 4 |
| B | do | 2 | 3 |
| C | Triethylenetetramine | 2 | 4 |
| D | do | 3 | 3 |

[1] 2-hydroxy-3-sulfopropyl.
[2] Carboxymethyl.

Table II lists the amount of iron chelated at various levels of pH by the substituted polyamine products of Examples 1–5. Also listed for purpose of comparison are the results obtained in the same test with related substituted polyamines A, B, C, and D which are outside the present invention. Iron chelation was determined by colorimetric iron analysis using 1,10-phenanthroline, see Sandell, Colorimetric Determination of Traces of Metals, vol. 3, Interscience, New York (1959), pages 537 and 541, also Snell et al., Colorimetric Methods of Analysis, vol. 2, Van Nostrand, New York (1949), page 316.

TABLE II

| Product Example | Grams millimoles Fe/millimole amine at— | | | | | |
|---|---|---|---|---|---|---|
| | pH 7 | pH 9 | pH 10 | pH 11 | pH 12 | pH 13 |
| 2 | 0.54 | 0.54 | 0.52 | 0.49 | 0.37 | 0.29 |
| A | 0.31 | 0.24 | 0.23 | 0.22 | 0.09 | 0 |
| B | 0.47 | 0.43 | 0.43 | 0.36 | 0.32 | 0.15 |
| 1 | 0.74 | 0.79 | 0.81 | 0.78 | 0.72 | 0.74 |
| 3 | 0.12 | 0.33 | 0.39 | 0.46 | 0.57 | 0.53 |
| C | 1.25 | 0.86 | 0.83 | 0.68 | 0.45 | 0.25 |
| D | 0.90 | 0.81 | 0.79 | 0.65 | 0.33 | 0.23 |

In the above table of comparative data, it is seen that the substituted diethylenetriamine compounds A and B, which contain more carboxymethyl groups than sulfonate groups, show a lower overall capacity for iron chelation and a decided disadvantage at very high pH as compared to the product of Example 2 which contains more sulfonate groups than carboxymethyl groups in its molecular structure. Similarly, the substituted triethylenetetramines of the prior art, products C and D, show a considerable drop in iron chelation at high pH as compared to the products of Examples 1 and 3.

Corresponding superiority in iron chelating capacity, particularly at high pH, is shown for the products of Examples 4 and 5, the substituted tetraethylenepentamines, as compared to similar tetraethylenepentamines having lower proportions of sulfonate substituents. The same kind of advantage is also found for pentaethylenehexamine and other polyalkylenepolyamines containing carboxymethyl and 2-hydroxy-3-sulfopropyl groups in the proportions defined for the invention.

I claim:
1. A compound having the formula

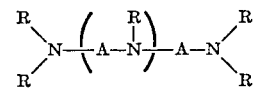

wherein $n$ is an integer from 1 to about 20, A is an alkylene radical of 2–3 carbon atoms, and each R is a carboxymethyl group or a 2-hydroxy-3-sulfopropyl group, the number of 2-hydroxy-3-sulfopropyl groups being greater than the number of carboxymethyl groups.

2. The compound of claim 1 wherein $n$ is 1–5.
3. The compound of claim 1 wherein A is an ethylene group.
4. The compound of claim 3 wherein $n$ is 1, two R's are carboxymethyl groups and three R's are 2-hydroxy-3-sulfopropyl groups.
5. The compound of claim 3 wherein $n$ is 2, two R's are carboxymethyl groups and four R's are 2-hydroxy-3-sulfopropyl groups.

References Cited

UNITED STATES PATENTS 3,091,522   5/1963   Hemwall _____ 260—513 N

LEON ZITVER, Primary Examiner

J. E. EVANS, Assistant Examiner

U.S. Cl. X.R.

71—103, Dig. 2; 260—439 R